US012021750B2

(12) United States Patent
Janakiraman et al.

(10) Patent No.: US 12,021,750 B2
(45) Date of Patent: Jun. 25, 2024

(54) SPECIFYING ROUTES TO ENABLE LAYER-2 MOBILITY IN HYBRID-CLOUD ENVIRONMENTS

(71) Applicant: Cisco Technology, Inc., San Jose, CA (US)

(72) Inventors: Rajagopalan Janakiraman, Cupertino, CA (US); Suresh Pasupula, Bentonville, AR (US); Manju Ramesh, San Jose, CA (US); Christophe Paggen, Foret (BE); Huyen Trung Duong, Singapore (SG); Lukas Krattiger, The Woodlands, TX (US)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 17/882,163

(22) Filed: Aug. 5, 2022

(65) Prior Publication Data
US 2024/0048485 A1 Feb. 8, 2024

(51) Int. Cl.
*H04L 45/745* (2022.01)
*H04L 45/24* (2022.01)
*H04L 45/42* (2022.01)
*H04L 61/5007* (2022.01)

(52) U.S. Cl.
CPC ............ *H04L 45/745* (2013.01); *H04L 45/24* (2013.01); *H04L 45/42* (2013.01); *H04L 61/5007* (2022.05)

(58) Field of Classification Search
CPC ... H04L 45/745; H04L 61/5007; H04L 45/24; H04L 45/42
See application file for complete search history.

(56) References Cited

U.S. PATENT DOCUMENTS

| 11,032,369 | B1 * | 6/2021 | Wei | H04L 61/5007 |
| 2019/0109729 | A1 * | 4/2019 | De Luca | H04L 45/17 |
| 2019/0199587 | A1 * | 6/2019 | Mudigonda | H04L 41/0813 |
| 2020/0235990 | A1 * | 7/2020 | Janakiraman | H04L 41/0893 |
| 2020/0382471 | A1 * | 12/2020 | Janakiraman | H04L 61/5007 |
| 2021/0258216 | A1 | 8/2021 | Janakiraman et al. | |
| 2021/0266256 | A1 * | 8/2021 | Janakiraman | H04L 43/16 |

OTHER PUBLICATIONS

PCT Search Report and Written Opinion dated Nov. 6, 2023 for PCT Application No. PCT/US2023/029481, a foreign counterpart to U.S. Appl. No. 17/882,163, 28 pages.

* cited by examiner

*Primary Examiner* — Oleg Survillo
*Assistant Examiner* — Monishwar Mohan
(74) *Attorney, Agent, or Firm* — Lee & Hayes P.C.

(57) ABSTRACT

Techniques for using more-specific routing to perform scalable Layer-2 (L2) stretching of subnets across hybrid-cloud environments. Routing tables in a public cloud may allow for routes that are more specific than the default local route, and the more-specific routes may be used to send all traffic to a dedicated, cloud router. The more-specific routes are set up for a VPC where a subnet resides such that the more specific-routes cover at least a portion of subnet range. The next hop for the more-specific routes point to the cloud router which is capable of doing host routing and segmentation extension. Thus, traffic originating from endpoints in a VPC is routed to the cloud router, and the cloud router determines whether the traffic is to be re-routed back to a destination endpoint in the VPC (or another cloud location), or sent to a destination endpoint residing in the on-premises site.

16 Claims, 6 Drawing Sheets

300

```
┌─────────────────────────────────────────────────────────────────────────┐
│ CREATE A PRIVATE ADDRESS SPACE BY ALLOCATING AN INTERNET PROTOCOL (IP)  │
│ ADDRESS RANGE TO A SUBNETWORK THAT IS STRETCHED ACROSS A HYBRID         │
│ CLOUD ENVIRONMENT                                                        │
│ 302                                                                      │
└─────────────────────────────────────────────────────────────────────────┘
                                    ↓
┌─────────────────────────────────────────────────────────────────────────┐
│ CREATE A FIRST MORE-SPECIFIC ROUTE THAT CORRESPONDS TO A FIRST SUB-IP-  │
│ ADDRESS-RANGE OF THE IP ADDRESS RANGE OF THE SUBNETWORK, WHEREIN A      │
│ FIRST NEXT HOP FOR THE FIRST MORE-SPECIFIC ROUTE SENDS DATA TRAFFIC     │
│ TO A CLOUD ROUTER OF THE CLOUD ENVIRONMENT                              │
│ 304                                                                      │
└─────────────────────────────────────────────────────────────────────────┘
                                    ↓
┌─────────────────────────────────────────────────────────────────────────┐
│ CREATE A SECOND MORE-SPECIFIC ROUTE THAT CORRESPONDS TO A SECOND SUB-IP-│
│ ADDRESS-RANGE OF THE IP ADDRESS RANGE OF THE SUBNETWORK, WHEREIN A      │
│ SECOND NEXT HOP FOR THE SECOND MORE-SPECIFIC ROUTE SENDS DATA TRAFFIC   │
│ TO THE CLOUD ROUTER OF THE CLOUD ENVIRONMENT                            │
│ 306                                                                      │
└─────────────────────────────────────────────────────────────────────────┘
                                    ↓
┌─────────────────────────────────────────────────────────────────────────┐
│ PROGRAM THE FIRST MORE-SPECIFIC ROUTE AND THE SECOND MORE-SPECIFIC      │
│ ROUTE INTO ROUTING TABLES OF THE CLOUD ENVIRONMENT SUCH THAT TRAFFIC    │
│ ORIGINATING FROM AT LEAST THE FIRST ENDPOINTS IN THE VPC IS ROUTED TO   │
│ THE CLOUD ROUTER                                                         │
│ 308                                                                      │
└─────────────────────────────────────────────────────────────────────────┘
                                    ↓
┌─────────────────────────────────────────────────────────────────────────┐
│ RECEIVE, AT THE CLOUD ROUTER, DATA TRAFFIC ORIGINATING FROM ONE OF THE  │
│ FIRST ENDPOINTS IN THE VPC                                               │
│ 310                                                                      │
└─────────────────────────────────────────────────────────────────────────┘
                                    ↓
┌─────────────────────────────────────────────────────────────────────────┐
│ ROUTE THE DATA TRAFFIC BASED AT LEAST IN PART ON A DESTINATION IP       │
│ ADDRESS OF THE DATA TRAFFIC AND A ROUTING TABLE ASSOCIATED WITH THE     │
│ CLOUD ROUTER                                                             │
│ 312                                                                      │
└─────────────────────────────────────────────────────────────────────────┘
```

FIG. 3

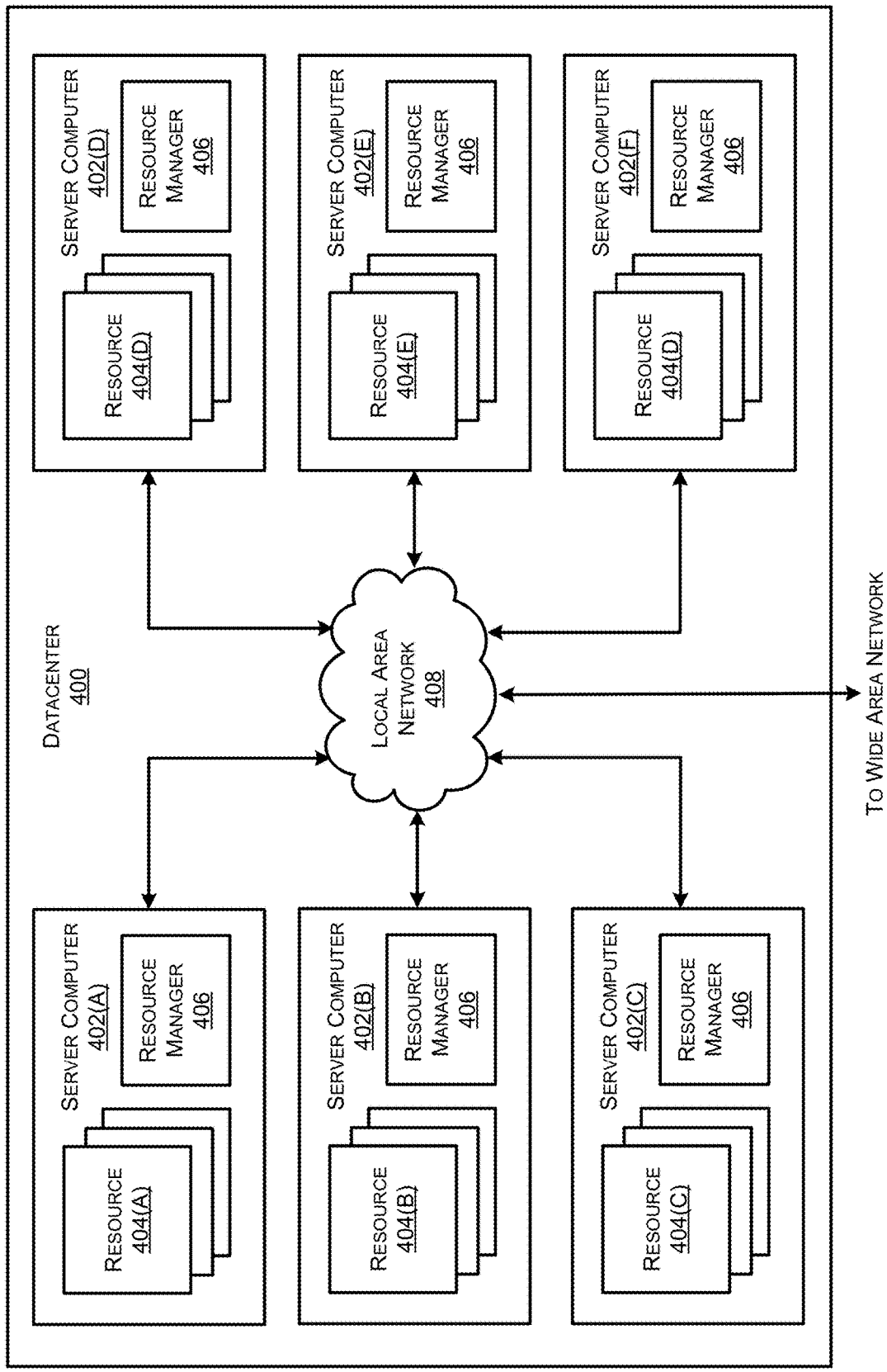

SPECIFYING ROUTES TO ENABLE LAYER-2 MOBILITY IN HYBRID-CLOUD ENVIRONMENTS

TECHNICAL FIELD

The present disclosure relates generally to specifying routes to enable Layer-2 stretching of subnetworks across hybrid-cloud environments.

BACKGROUND

With the continued increase in the proliferation and use of devices with Internet accessibility, the demand for Internet services and content has similarly continued to increase. The providers of the Internet services and content continue to scale the computing resources required to service the growing number of user requests without falling short of user-performance expectations. For instance, providers typically utilize large and complex datacenters to manage the network and content demands from users. The datacenters generally comprise server farms that host workloads that support the services and content, and further include network devices, such as switches and routers, to route traffic between and through the datacenters and enforce security policies.

Generally, these networks of datacenters can come in two flavors, private networks owned by entities such as enterprises or organizations (e.g., on-premises networks), and public cloud networks owned by cloud providers that offer compute resources for purchase by users. Often, enterprises will own, maintain, and operate on-premises networks of compute resources to provide Internet services and/or content for users or customers. However, as noted above, it can become difficult to satisfy the increasing demands for computing resources while maintaining acceptable performance for users. Accordingly, private entities often purchase or otherwise subscribe for use of compute resources and services from public cloud providers. For example, cloud providers can create virtual private clouds (also referred to herein as "private virtual networks") on the public cloud and connect the virtual private cloud or network to the on-premises network in order to grow the available compute resources and capabilities of the enterprise. Thus, enterprises can interconnect their private or on-premises network of datacenters with a remote, cloud-based datacenter hosted on a public cloud, and thereby extend their private network.

However, because on-premises networks and public cloud networks are generally developed and maintained by different entities, there is a lack of uniformity in the policy management and configuration parameters between the datacenters in the on-premises networks and public cloud networks. This lack of uniformity can significantly limit an enterprise's ability to integrate their on-premises networks with public cloud networks by, for example, being unable to apply consistent policies, configuration parameters, routing models, and so forth. Various entities have developed software-defined network (SDN) and datacenter management solutions that translate the intents of enterprise or organizations from their on-premises networks into their virtual private cloud networks for applications or services that are deployed across multi-cloud fabrics or environments. Accordingly, these multi-cloud SDN solutions must continually adapt for changes occurring within the on-premises networks and public cloud networks, while maintaining the business and user intents of the enterprises or organizations that supplement their on-premises networks with computing resources from the public cloud networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for using more-specific routing to perform scalable L2 stretching of a subnet across a hybrid cloud environment.

FIG. 4 illustrates a computing system diagram illustrating a configuration for a datacenter that can be utilized to implement aspects of the technologies disclosed herein.

DESCRIPTION OF EXAMPLE EMBODIMENTS

Overview

Figure 1:
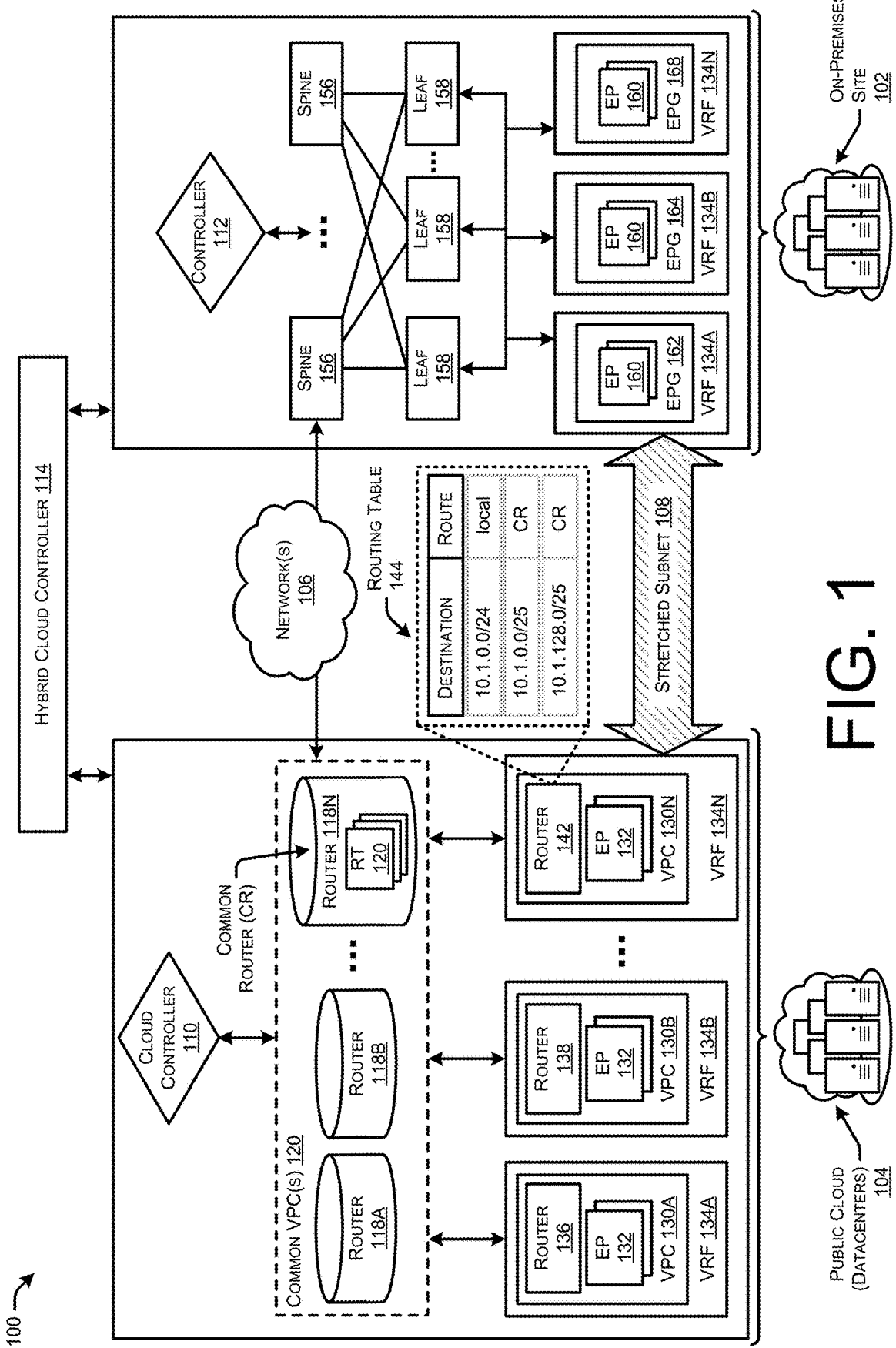
FIG. 1 illustrates a system diagram of an example architecture of a hybrid-cloud environment in which more-specific routing is utilized to perform scalable L2 stretching of a subnet across a public cloud and on-premises site.

The disclosure describes techniques including a method of using more-specific routing to perform scalable Layer-2 (L2) stretching of subnets across hybrid-cloud environments. The method may include creating a private address space by allocating an Internet Protocol (IP) address range to a subnetwork that is stretched across a hybrid cloud environment. In some instances, first endpoints of the subnetwork are hosted in a virtual private cloud (VPC) of a cloud environment of the hybrid cloud environment and second endpoints of the subnetwork are hosted in an on-premises site of the hybrid cloud environment. The method may further include creating a first more-specific route that corresponds to a first sub-IP-address-range of the IP address range of the subnetwork where a first next hop for the first more-specific route sends data traffic to a cloud router of the cloud environment. Further, the method may include creating a second more-specific route that corresponds to a second sub-IP-address-range of the IP address range of the subnetwork where a second next hop for the second more-specific route sends data traffic to the cloud router of the cloud environment. Additionally, the method may include programming the first more-specific route and the second more-specific route into routing tables of the cloud environment such that traffic originating from at least the first endpoints in the VPC is routed to the cloud router. Further, the method may include receiving, at the cloud router, data traffic originating from one of the first endpoints in the VPC, and routing the data traffic based at least in part on a destination IP address of the data traffic and a routing table associated with the cloud router.

Additionally, the techniques described herein may be performed by a system and/or device having non-transitory computer-readable media storing computer-executable instructions that, when executed by one or more processors, performs the method described above.

EXAMPLE EMBODIMENTS

As noted above, enterprises and other organizations may own, maintain, and operate on-premises networks of compute resources for users or customers, and also for supporting internal compute requirements for running their organizations. However, due to the difficulties in satisfying the increasing demands for computing resources while maintaining acceptable performance for users, these enterprises may otherwise subscribe for use of compute resources and services from public cloud providers. For example, cloud providers can create virtual private clouds (also referred to herein as "private virtual networks") on the public cloud and connect the virtual private cloud or network to the on-premises network in order to grow the available compute resources and capabilities of the enterprise. Thus, enterprises can interconnect their private or on-premises network of datacenters with a remote, cloud-based datacenter hosted on a public cloud, and thereby extend their private network.

However, in hybrid-cloud environments where applications stretch between the public cloud and on-premises, it previously was difficult or impossible to perform L2 stretching using capabilities of the public cloud networks. That is, public clouds did not have capabilities for route traffic between, for instance, VPCs in a same subnet of the public cloud because a routing table cannot be more specific than the default local route. Stated otherwise, no route in the public cloud was able to have a destination using a smaller classless inter-domain routing (CIDR) range than the default local route (which is the CIDR range of the whole VPC). As an example, when the VPC range is 10.0.0/16 and a subnet has 10.0.1.0/24, a route to 10.0.1.0/24 is more specific than a route to 10.0.0/16. This made it impossible to stretch endpoints of a subnet between public cloud and on-premises sites.

This disclosure describes techniques for using more-specific routing to perform scalable L2 stretching of subnets across hybrid-cloud environments. Routing tables in the public cloud may allow for routes that are more specific than the default local route, and the more specific routes may be used to send all traffic to a dedicated, common cloud router that resides in a common VPC. The techniques include setting up more specific routes in a VPC where a subnet resides such that the more specific routes cover at least a portion, and potentially the entire, subnet range. For instance, if the subnet is 10.1.0.0/24, the more specific routes may be setup as 10.1.0.0/25 and 10.1.128.0/25. The next hop for the more specific routes point to the common cloud router which is capable of doing host routing and segmentation extension using a control plane technology (e.g., Border Gateway Protocol (BGP), Ethernet Virtual Personal Network (EVPN), Virtual Extensible Local Area Network (VXLAN), etc.). In this way, traffic originating from endpoints in a VPC where a stretched subnet resides is routed to the common cloud router, and the common cloud router determines whether the traffic is to be re-routed back to a destination endpoint in the VPC (or another location in the cloud), or sent across one or more networks (e.g., Internet) to a destination endpoint residing in the on-premises site.

In the cloud router, the destination subnet is looked up for traffic originating at an endpoint in the public cloud and routed to the cloud router using the more-specific routes. If the destination Internet Protocol (IP) address in the subnet belongs to an on-premises destination, it is routed via a data path setup by the control plane (BGP EVPN), However, if the destination IP address happens to be a workload or endpoint in the cloud VPC, the traffic is re-routed (or "hair pinned") back from the cloud router in the common VPC to the user VPC (or originating VPC). The routing tables in the direction from the common VPC having the cloud router to user VPC are setup to forward traffic to this subnet to the user VPC, where the subnet resides.

Generally, the cloud router determines the destination IP addresses in the stretched subnet via probing on the cloud for creation/deletion of workloads, and if the Network Interface Controller (NIC) on the workload falls under one of the "stretched subnets," a cloud controller programs a specific/32 static route for the IP address in the cloud router with a next hop of the user VPC (where the workload resides) or a network attachment (e.g., gateways, Virtual de-area network (VWAN) Hubs, etc.) which is connected to the user VPC. Additionally, the cloud router advertises this static route to other on-premises sites using host routes or type-2 routes in the BGP EVPN control plane.

Further, the cloud controller may connect to an on-premises controller and set up the host routing for the stretched subnet. This allows for the individual IP addresses in the subnet that reside in the on-premises site(s) to be advertised to the cloud. The on-premises controller further enables proxy-address-resolution-protocol (proxy-ARP) on the subnet for any traffic received on the subnet to another host in the same subnet to be routed via an on-premises gateway instead of being bridged. This sets up the end to end communication between two hosts in the same subnet where one host resides in on-premises while the other one resides in the cloud.

The proposed techniques described herein allow for stretching of subnets between on-premises data centers and public clouds using a scalable solution making use of more-specific routing in public cloud combined with host routing in cloud router with end-to-end automation from a cloud controller with a simple user intent. With this scheme, two endpoints (such as workloads, virtual machines (VMs), containers, and/or any other processes) the same subnet can talk to each other where one of the endpoints is in on-premises datacenter and the other one in the public cloud.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example architecture of a hybrid-cloud environment 100 in which more-specific routing is utilized to perform scalable L2 stretching of a subnet across a public cloud and on-premises site. In this example, the hybrid-cloud fabric 100 may include an on-premises site 102 comprised of one or more on-premises datacenters, and at least one public cloud network 104 comprised of one or more cloud datacenters. The datacenters may comprise any type of datacenter housing endpoints (e.g., servers) for supporting workloads, virtual machines, containers, etc., as well as networking devices (e.g., switches, routers, gateways, etc.) for facilitating the communication of traffic in the networks according to specified routing models, security policies, and so forth.

In this example, the on-premises site 102 may implement a specific SDN or datacenter solution and controller 112, such as Cisco's Application Centric Infrastructure (ACI), while the public cloud may implement different cloud controllers 110 or solutions, such as Amazon's AWS, Microsoft's Azure, Google Cloud, and so forth. In some aspects, the on-premises site 102 and the public cloud 104 can integrate with a hybrid-cloud or hybrid-fabric management controller 102 or orchestrator which can manage and/or integrate one or more routing or security features or constructs, such as security groups (e.g., EPGs) or routing domains (e.g., virtual routing and forwarding instances, virtual private networks, subnets, etc.), across the on-premises site 102 and the public cloud 104.

Generally, the security policies and network configurations of the networks can be managed by one or more controllers associated with the respective cloud provider and/or site, and/or an SDN controller for the hybrid-cloud solution, such as an ACI Application Policy Infrastructure Controller (APIC) and/or a hybrid-cloud APIC (or "multi-site"). The networking configurations and policies in public cloud 104 can have various routing and policy models or schemes, and different restrictions imposed by a cloud provider. For example, a cloud provider may impose restrictions which limit the number of security policies supported by an associated public cloud much below the scale of policies supported by the datacenter solution implemented at the on-premises site 102. Accordingly, when Cisco's ACI solution is integrated with a public cloud solution, such as Amazon's AWS, the public cloud's restrictions can impose different restrictions on the ACI solution and create inconsistent policy models.

Accordingly, the hybrid-cloud fabric 100 can also include a hybrid-site controller 112 (e.g., hybrid-site APIC) which communicates with the controller 110 in the public cloud network 104 (e.g., cloud APIC), as well as controller(s) 112 in the on-premises network 102. The hybrid-cloud controller 114 may work with the controllers 110/112 to manage and implement policies and configurations on both the on-premises network 102 and the public cloud network 104. The hybrid-cloud controller 114 can implement, such as by translating, a same policy model or routing policies in the on-premises network 102 and the public cloud networks 104, which can be based on a particular SDN or datacenter solution such as Cisco's ACI. For example, the hybrid-cloud controller 114 can implement VRFs, EPGs and associated policies in the on-premises site 102 as well as the public cloud 104. Such policies can be coordinated by the hybrid-cloud controller 114 with the controller 112 in the on-premises site 102 and the cloud controller 110 in the public cloud 104.

The on-premises site 102 can be configured according to the specific SDN or datacenter platform implemented by the on-premises site 102, such as Cisco's ACI, which can be implemented and/or managed via one or more controllers, such as controller 112 (e.g., APIC). The controller 112 can manage security policies and interconnectivity for elements in the on-premises site 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 102. For example, the on-premises site 102 can include spine switches 156 and leaf switches 158 configured to provide network connectivity to EPs 160 in the on-premises site 102. In this example, the controller 112 can manage security policies and interconnectivity for traffic processed by the spine switches 156, the leaf switches 158, and the EPs 160.

The controller 112 can configure Endpoint Groups (EPGs) 162, 164, and 168 (EPG 1, EPG 2, EPG N), which can be used to manage and implement policies and configurations for groups of endpoints 160. EPGs (e.g., 162, 164, and 168) are managed objects that contain endpoints (e.g., VMs, software containers, virtual appliances, servers, applications, service chains, workloads, etc.) that are connected to the network (e.g., on-premises site 102) either directly or indirectly. Each EPG 162, 164, and 168 can include a group of endpoints 160.

The endpoints 160 (e.g., VMs, containers, servers, etc.) in the EPGs 162, 164, and 168 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs 162, 164, and 168 can span multiple switches and can be associated with respective bridge domains (BDs). In some aspects, endpoint membership in an EPG can be static or dynamic.

EPGs 162, 164, and 168 can contain respective endpoint memberships and can represent different EPGS (e.g., logical groupings) that are based on different, respective factors as previously explained. For example, EPG 162 may represent a logical grouping of endpoints (e.g., VMs) configured as web servers (e.g., WEB-EPG), EPG 164 may represent a logical grouping of endpoints (e.g., VMs) configured as database servers (e.g., DB-EPG), and EPG 168 may represent a logical grouping of endpoints (e.g., VMs) configured as specific application servers (e.g., APP-EPG). The controller 112 can configure specific policies (e.g., contracts, filters, requirements, etc.) for each of the EPGS 162, 164, and 168. Such policies or contracts can define, for example, what EPGs can communicate with each other and what type of traffic can pass between the EPGs 162, 164, and 168.

The controller 112 can also configure virtual routing and forwarding (VRF) instances 134A, 134B, 134N which provide different address domains that serve as private networks and segregate traffic between the VRFs. The VRFs 134A-N can include various, respective objects such as endpoints (e.g., VMs) EPGs (e.g., 162, 164, and 168), etc. For example, EPG 162 can reside in VRF 146A, EPG 162 can reside in VRF 134B, and EPG 168 can reside in VRF 134N. In some cases, the controller 112 can configure other types of routing domains, such as virtual private networks or subnets, in addition to, or in lieu of, VRFs.

The hybrid-cloud fabric 100 can also include a hybrid-cloud controller 114 (e.g., multi-site APIC) which communicates with controller 112 in the on-premises site 102 and cloud controller 110 (e.g., cloud APIC) on the public cloud 104, and works with controller 110 and cloud controller 112 to manage and implement policies and configurations on both the on-premises site 102 and the public cloud 104. The hybrid-cloud controller 110 can implement a same policy model on the on-premises site 102 and the public cloud 104, which can be based on a particular SDN or datacenter platform such as Cisco's ACI. For example, the hybrid-cloud controller 110 can implement VRFs, EPGs and associated policies on the on-premises site 102 as well as the public cloud 104. Such policies can be coordinated by the hybrid-cloud controller 110 with the controller 110 in the on-premises site 102 and the cloud controller 112 in the public cloud 104.

The public cloud 104 can also implement a different policy model and may have its own sets of requirements (e.g., policy requirements, scalability requirements, etc.) which may differ from those imposed by the platform implemented by the hybrid-cloud controller 114 and the controller 112. The policy models and requirements on the public cloud 104 can depend on the cloud provider. For example, AWS may implement security groups and impose a 250-rule limit, and Azure may implement application or network security groups with different policy restrictions and limitations. As further described below, the approaches herein can integrate and scale routing, policies, and requirements imposed by the public cloud 104 with those associated with the cloud controller 110, the hybrid-cloud controller 114, and the controller 112, in order to apply a consistent routing and policy model and increase the scalability of the overall platform implemented on the hybrid-cloud fabric 100, including the public cloud 104.

The public cloud 104 can include one or more routing domains, such as virtual private clouds (VPCs) 130A, 130B, and 130N, which represent private networks on the public cloud 104 and which can be interconnected with the on-premises site 102 as described herein. The VPCs 130A, 130B, and 130N can host applications and resources on the public cloud 104 for use by the on-premises site 102. In some cases, the VPCs 130A, 130B, and 130N can represent or map to VRFs (e.g., 134A, 134B, 134N) on the on-premises site 102.

The VPCs 130A, 130B, and 130N can include endpoints (EPs) 132 on the public cloud 104. The EPs 132 can include virtual/logical and/or physical endpoints, such as VMs, software containers, physical servers, etc. The EPs 132 can be included in service policy groups, which are policy constructs implemented by the public cloud 104. In some cases, the security groups can be translated to Endpoint Policy Groups (EPGs) to provide consistency, integration, and/or uniformity with EPGs 162, 164, and 168 in the on-premises site 102. The service policy groups can include one or more respective service policies defined for traffic matching one or more attributes associated with the service groups, such as IP addresses (e.g., the IP addresses of EPs 132 in the service groups), labels (e.g., VM labels or tags), EP attributes (e.g., VM names or characteristics), IP prefixes, etc.

Traffic to and from the VPCs 130A, 130B, and 130N can be routed via routers 136, 138, and 142, which can include virtual cloud routers, virtual private gateways or VPN gateways (hereinafter "vGWs"), cloud services routers (CSR) such as Cisco CSR1 kV routers, and the like. The routers 136, 138, and 142 can serve as the ingress and egress points of the VPCs 130A, 130B, and 130N, and can interconnect the VPCs 130A, 130B, and 130N with each other as well as other external devices or networks (e.g., on-premises site 102) through cloud routers 118A, 118B, and 118N. In some examples, the routers 136, 138, and 142 can serve as L2 proxy routers configured to perform tunneling and/or encapsulation functions, such as GRE (Generic Routing Encapsulation) or IPsec (Internet Protocol Security) tunneling. In other examples, the EPs 132 can serve as or implement L2 proxy routers configured to perform tunneling and/or encapsulation functions, such as GRE or IPsec tunneling.

The cloud routers 118A, 118B, and 118N can include virtual cloud routers, virtual gateways, CSR routers such as Cisco CSR1 kV routers, and the like. The cloud routers 118A, 118B, and 118N can be configured to perform control plane and/or data plane functionalities. Moreover, in some examples, the cloud routers 118A, 118B, and 118N can serve as cloud overlay routers that provide overlay functions for one or more routing domains and connect peers or endpoints from other sites, such as the on-premises site 102 and/or a different public cloud. The cloud routers 118A, 118B, and 118N can be within a common network or routing domain, such as common VPC 120. VPC 120 can be a hub or infra VPC, which can interconnect other VPCs. That is, the VPCs 130 may be user VPC 130 used by users of the public cloud, and the common VPC 120 may be a hub or infra VPC.

The routers 136, 138, and 142 can provide interconnectivity between the public cloud 104 and the on-premises site 102 through the cloud routers 118A, 118B, 118N. In some cases, the cloud routers 118A, 118B, 118N can manage the importing and exporting of routes into the on-premises site 102, the hybrid-cloud controller 114, etc., in order to support interconnectivity between the public cloud 104 and the on-premises site 102. In some implementations, the cloud routers 118A, 118B, 118N can import and export routes using EVPN (Ethernet Virtual Private Network) BGP (border gateway protocol). In some examples, the cloud routers 118A, 118B, 118N can establish BGP sessions with the on-premises site 102 and/or the hybrid-cloud controller 114 to exchange routes.

The hybrid-cloud controller 114 can map the local virtual or private network (e.g., VRFs 134, VPCs 130) segment identifiers (IDs) between the on-premises site 102 and the public cloud 104 and/or between various public cloud sites, and can manage the route import and export into the corresponding virtual or private networks (e.g., VRFs, VPCs) through, for example, mapping of BGP or BGP EVPN route targets. This strategy can establish a common routing and forwarding plane for the on premises site 102 and the public cloud 104.

The hybrid-cloud fabric 100 shown in FIG. 1 can include one or more additional public clouds which can implement a different policy model, environment, and/or cloud or datacenter platform as public cloud 104 and/or on-premises site 102 and which may have different requirements or limitations as public cloud 104 and/or on-premises site 102. For example, in some aspects, the on-premises site 102 may implement Cisco's ACI platform, while the public cloud 104 implements a different cloud platform, such as Amazon's AWS. Thus, cloud providers in many cases impose various resource limitations and policy restrictions which can limit the scale of resources and policies implemented in a hybrid environment such as the hybrid-cloud fabric 100.

Fabric policy/rules on the cloud can be applied to destination endpoints and Layer 4 (L4) ports. Destination endpoints can be classified by a group, a prefix, a label, an IP address, etc., depending on the cloud or datacenter platform. While grouping endpoints or traffic based on common criteria helps in scaling security and policy rules, the different traffic categorization schemes and policy models implemented by different cloud or datacenter platforms can limit routing and forwarding uniformity and often prevent integration of fabric rules across different cloud or datacenter environments. For example, public clouds (e.g., Amazon AWS) often do not provide a Layer 2 (L2) stretch functionality. This in turn means that any fabric policy extension across such cloud sites need to be applied on Layer 3 (L3) constructs, which can become significantly limited by the cloud provider's resource scale limits as mentioned above. Furthermore, such an approach my require installation of a hypervisor to over-write the routing and forwarding restrictions that may be imposed by a public cloud provider such as the case may be with Amazon AWS. As such an overlay approach for policy extension across different platforms may not work on systems that does not allow administrator level access to the hypervisor level.

As illustrated, the techniques described herein include performing scalable L2 stretching of a stretched subnet 108 between a public cloud 104 and an on-premises site 102. Generally, a stretched subnet may be a Virtual Local Area Network (VLAN) that spans multiple physical data centers. In this situation, the stretched VLANs is a L2 extension that results in an IP address range being stretched across multiple sites, such as multiple datacenters.

In a hybrid-cloud environment (e.g., 100) with applications stretching between on-premises data-centers and the public cloud, it may not be natively possible to perform a Layer 2 network extension (e.g., for a private address space) by using just the cloud constructs. For example, Amazon Public cloud AWS imposes certain restrictions within their Virtual Private Cloud (VPC) constructs which prevents VPC data traffic destined to an IP address that falls within the assigned IP address range of the VPC to exit the VPC. Traditionally, there were cloud imposed restrictions on the smallest range of IP addresses that may be assigned to a VPC instance. Such routing and forwarding policy restrictions previously presented significant hindrance, for example, for any client trying to stretch a subnet across an on-premises site (e.g., 102) and a public cloud (e.g., 104) or migrate a Virtual Machine (VM) from on-premises 102 to public cloud 104 without having to change the existing IP assignment of the VM being moved.

However, the public cloud 104 may now have routing tables (e.g., routing tables 120) that may allow for routes that are more specific than the default local route, and the more-specific routes may be used to send all traffic to a dedicated, common cloud router 118 that resides in a common VPC 120. The techniques include setting up more specific routes in a VPC 130 where a subnet resides such that the more specific routes cover at least a portion, and potentially the entire, subnet range. For instance, if the subnet is 10.1.0.0/24, the more specific routes may be setup as 10.1.0.0/25 and 10.1.128.0/25 such that they cover the entire range of IP addresses of the default local route. Thus, a router 142 may have a routing table 144 that has a default route of 10.1.0.0/24, and more-specific routes for destinations 10.1.0.0/25 and 10.1.128.0/25. The next hop for the more-specific routes point to the common cloud router 118 which is capable of doing host routing and segmentation extension using a control plane technology (e.g., Border Gateway Protocol (BGP), Ethernet Virtual Personal Network (EVPN), Virtual Extensible Local Area Network (VXLAN), etc.). In this way, traffic originating from endpoints 132 in a VPC 130 where a stretched subnet 108 resides is routed to the common cloud router 118, and the common cloud router 118 determines whether the traffic is to be re-routed back to a destination endpoint 132 in the VPC 130 (or another location in the cloud), or sent across one or more networks 106 (e.g., Internet) to a destination endpoint 160 residing in the on-premises site 102.

In the cloud router 118, the destination subnet is looked up in a routing table 120 for traffic originating at an endpoint 132 in the public cloud 104 and routed to the cloud router 118 using the more-specific routes. If the destination IP address in the subnet belongs to an on-premises 102 destination endpoint 160, it is routed via a data path setup by the control plane (BGP EVPN). However, if the destination IP address happens to be a workload or endpoint 132 in a cloud VPC 130, the traffic is re-routed (or "hair pinned") back from the cloud router 118 in the common VPC 120 to the user VPC 130 (or originating VPC). The routing tables in the direction from the common VPC 120 having the cloud router 118 to user VPC 130 are setup to forward traffic to this subnet to the user VPC 130, where the subnet resides.

Generally, the cloud router 118 determines the destination IP addresses in the stretched subnet via probing on the public cloud 104 for creation/deletion of endpoints 132 (e.g., workloads), and if the NIC on the workload falls under one of the "stretched subnets," a cloud controller 110 programs a specific/32 static route for the IP address in the cloud router 118 with a next hop of the user VPC 130 (where the workload resides) or a network attachment (e.g., gateways, VWAN Hubs, etc.) which is connected to the user VPC 130. Additionally, the cloud router 118 advertises this static route to other on-premises sites 102 using host routes or type-2 routes in the BGP EVPN control plane.

Further, the cloud controller 110 may connect to an on-premises controller 112 and set up the host routing for the stretched subnet. This allows for the individual IP addresses in the subnet that reside in the on-premises site(s) 102 to be advertised to the cloud 104. The on-premises controller 112 further enables proxy-ARP on the subnet for any traffic received on the subnet to another host in the same subnet to be routed via an on-premises gateway instead of being bridged. This sets up the end to end communication between two hosts in the same subnet where one host resides in on-premises site 102 while the other one resides in the public cloud 104.

The proposed techniques described herein allow for stretching of subnets between on-premises data centers and public clouds using a scalable solution making use of more-specific routing in public cloud combined with host routing in cloud router with end-to-end automation from a cloud controller with a simple user intent. With this scheme, two endpoints (such as workloads, virtual machines (VMs), containers, and/or any other processes) in the same subnet can talk to each other where one of the endpoints is in on-premises datacenter and the other one in the public cloud.

Some examples of the present technology can include a system and method for providing L2 mobility in a hybrid cloud deployment between disparate platforms (e.g., between an on-premises fabric such as ACI and a public cloud system such as AWS, Azure, GCP, etc.) without requiring an overlay implementation. Therefore, in accordance with some examples of the present technology, an endpoint (e.g., a VM) may be moved from an on-premises site to a cloud site while remaining part of the same (on-premises) subnet (e.g., without requiring an IP address or address scope re-assignment). Accordingly, the VM may continue to communicate with other VMs within the same subnet residing in the on-premises site and/or other network elements deployed elsewhere in the on-premises site and/or one or more cloud sites without interruption to the interconnectivity and/or application stack.

The cloud router 118 may run a BGP EVPN session (e.g., control plane implemented with BGP and data forwarding plane implemented using Ethernet VPN) with the on-premises routers (e.g., Spines 156) to exchange reachability information (e.g., Segment ID, destination IP address, Next-hop Identifier) for the relevant set of prefixes. In an example when an endpoint is moved, the cloud router 118 is signaled with the corresponding segment identifier (e.g., in a VxLAN implementation, the segment identifier may be represented by the Virtual Network ID of the corresponding VRF where the subnet S is located) and a set of associated route-targets for identifying the prefix/host routes that can be imported. Accordingly, reachability information for endpoints in a subnet residing in other sites may be imported as host routes with the next-hop pointing to the corresponding site. Other endpoints outside of subnet (in the same or different VRF) which may be communicating with endpoints in the subnet may also be imported as prefix/host routes depending on how they are advertised. Consequently, the cloud router 118 may set up one or more overlay tunnels to reach the different sites where the relevant endpoints, corresponding to IP addresses both within and outside of the VPC CIDR range, may be located.

In the receiving router residing, for example, at the on-premises site 102, incoming traffic may be mapped to a corresponding routing domain (e.g., VRF domain) and an IP lookup may be performed to forward the traffic to the corresponding endpoint. According to some examples, an L2 proxy router, similar to the one set up in the cloud may be created on the on-premises sites where the subnet is located. The role of this proxy in the on-premises site 102 is to resolve Address Resolution Protocol (e.g., map an IP address to a physical machine address that is recognized in the local network) for the endpoints that are moved or running therein.

While EPGs are used herein to describe various aspects of the disclosure, it should be noted that other types of policy constructs, objects, and/or logical groupings can similarly be implemented as described herein. For example, in some cases, other types of security groups, managed objects or logical groups can similarly be implemented in addition to, or in lieu of, EPGs. EPGs are used herein for the sake of clarity and explanation purposes.

Figure 2A:
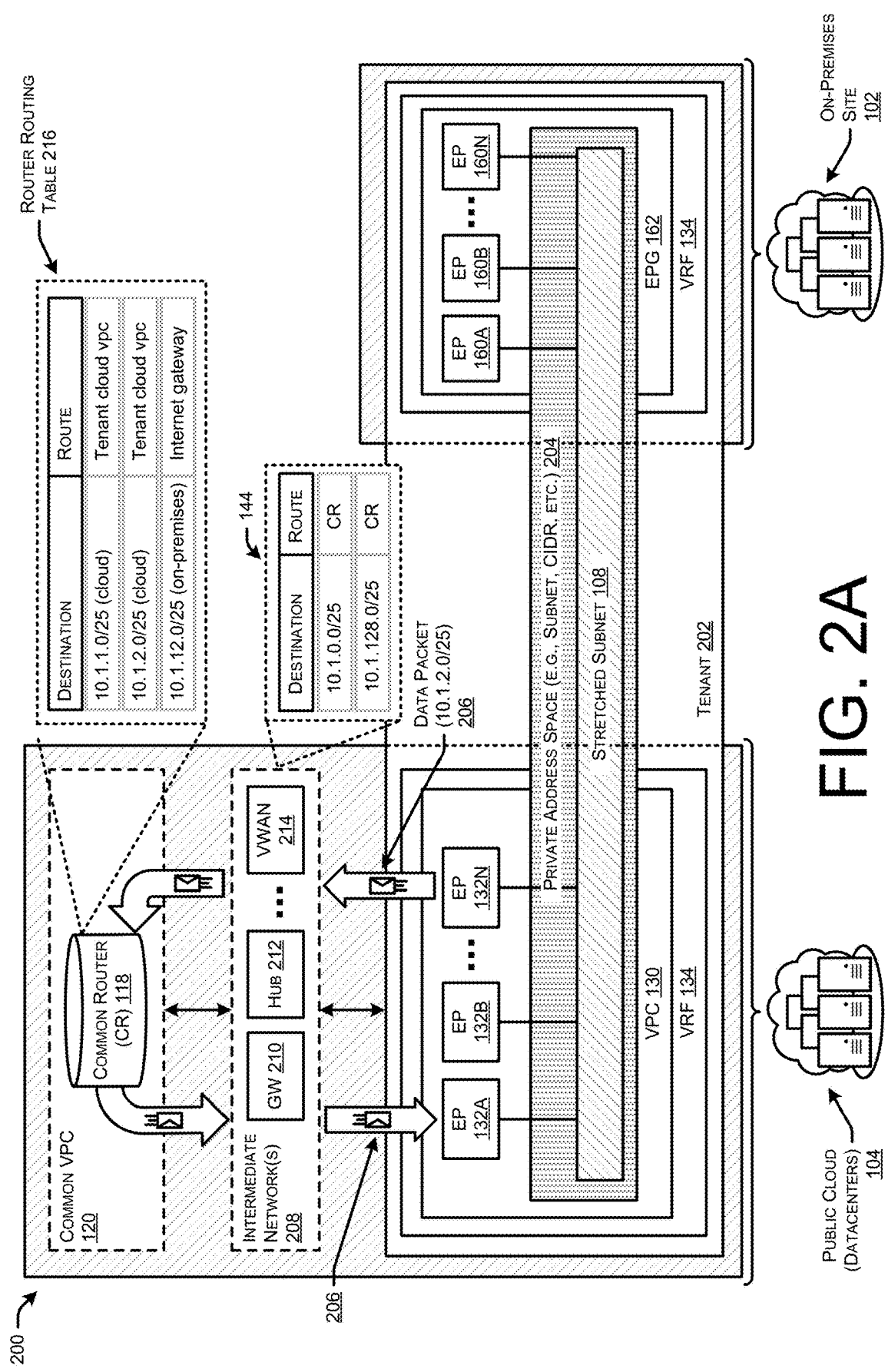
FIG. 2A illustrates an example data flow of a packet that is communicated from an endpoint in a VPC, routed to a common router in the public cloud due to a more-specific route, and re-routed back to the VPC to a destination endpoint.

FIG. 2A illustrates an example environment 200 in which a data flow of a packet is communicated from an endpoint in a VPC, routed to a common router in the public cloud due to a more-specific route, and re-routed back to the VPC to a destination endpoint.

Referring to FIG. 2A, a Layer 2 private address space 204 (e.g., Subnet, CIDR, etc.) belonging to tenant 202 is stretched between the on-premises site 102 and the cloud site 104 such that, for example, a stretched subnet 108 exists for endpoints 132 and 162 in the Layer 2 private address space 204 (e.g., Subnet/CIDR) is applicable across both on-premises site 102 and cloud site 104. A stretched subnet 108 can include an endpoint group that expands across multiple sites.

As shown, an EP 132 in a VC 130 of the public cloud 104 may generate and send a data packet 206 to a destination device. In some examples, there may be one or more intermediate networks 208 made up of cloud native devices between the VPC 130 where the stretched subnet resides and the common VPC 120, where the cloud router 118 resides. In such examples, the data packet 206 may be routed through the intermediate network(s) 208 that may include one or more cloud-native devices, such as gateways 210, hubs 212, VWANs 214, and so forth. The cloud controller 110 automates the programming of the routes in the intermediate network(s) 208 to setup the path between the VPC 130 and the cloud router 118. This ensures that any traffic destined to this subnet and originating from the same VPC 130, or another VPC 130, is always routed via the cloud router 118.

The network devices in the intermediate network 208 may include or have routing tables 144 populated with routes that are used to determine next hops for the data packet 206. As illustrated, the routing table 144 includes more specific routes that are set up as 10.1.0.0/25 and 10.1.128.0/25. The devices in the intermediate network(s) 208 use the routing table(s) 144 to determine that a next-hop in the route for the data packet 206 is the cloud router 118.

In the cloud router 118, the destination subnet is looked up in a router routing table 216 for the data packet 206. In this example, the destination IP address in the subnet belongs to a workload/endpoint 132 in a cloud VPC 130, and the data packet (traffic) 206 is re-routed (hair pinned) back from the common VPC 120 to the user 130. The routing tables 144 in the direction from the common VPC 120 to user VPC 130 are setup to forward traffic to this subnet to the user VPC 130, where the subnet resides. The cloud router 118 knows about the destination IP addresses on the stretched subnet via probing on the cloud 104 for creation/deletion of endpoints/workloads 132 and if the NIC on the endpoints/workloads 132 falls under one of the stretched subnets 108, the cloud controller 110 programs a specific/32 static route for the IP address in the router routing table 216 of the cloud router 118 with a next hop of the user VPC 130 (where the endpoints/workloads 132 resides) or the network attachment (GW 210, Hub 212, VWAN 214) which is connected to the user VPC 130. Also, the cloud router 118 advertises this static route to other on-prem sites 102 using host routes or type-2 routes in the BGP EVPN control plane. In this illustrated example, the data packet (and other traffic) 206 is sent to a destination EP 132 indicated by a destination IP address of the data packet 206.

Figure 2B:
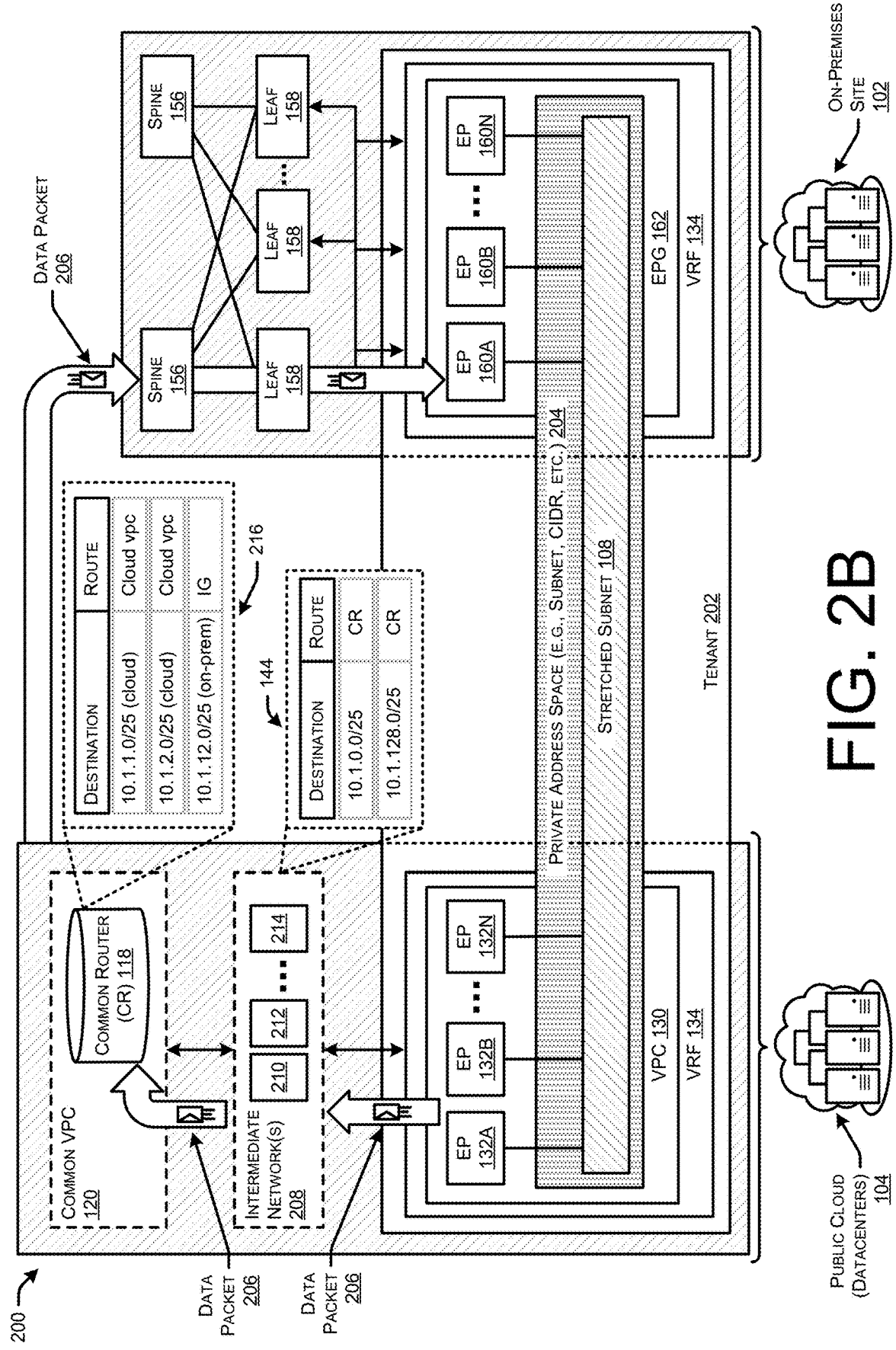
FIG. 2B illustrates an example data flow of a packet that is communicated from an endpoint in a VPC, routed to a common router in the public cloud due to a more-specific route, and routed across a public network to a destination endpoint in an on-premises site.

FIG. 2B illustrates an example data flow of a packet 206 that is communicated from an endpoint 132 in a VPC 130, routed to a common router 118 in the public cloud 104 due to a more-specific route, and routed across a public network 106 to a destination endpoint 160 in an on-premises site 102.

As shown, a Layer 2 private address space 204 (e.g., Subnet, CIDR, etc.) belonging to tenant 202 is stretched between the on-premises site 102 and the cloud site 104 such that, for example, a stretched subnet 108 exists for endpoints 132 and 162 in the Layer 2 private address space 204 (e.g., Subnet/CIDR) is applicable across both on-premises site 102 and cloud site 104. A stretched subnet 108 can include an endpoint group that expands across multiple sites.

As shown, an EP 132 in a VC 130 of the public cloud 104 may generate and send a data packet 206 to a destination device. In some examples, there may be one or more intermediate networks 208 made up of cloud native devices between the VPC 130 where the stretched subnet resides and the common VPC 120, where the cloud router 118 resides. In such examples, the data packet 206 may be routed through the intermediate network(s) 208 that may include one or more cloud-native devices, such as gateways 210, hubs 212, VWANs 214, and so forth. The cloud controller 110 automates the programming of the routes in the intermediate network(s) 208 to setup the path between the VPC 130 and the cloud router 118. This ensures that any traffic destined to this subnet and originating from the same VPC 130, or another VPC 130, is always routed via the cloud router 118.

The network devices in the intermediate network 208 may include or have routing tables 144 populated with routes that are used to determine next hops for the data packet 206. As illustrated, the routing table 144 includes more specific routes that are set up as 10.1.0.0/25 and 10.1.128.0/25. The devices in the intermediate network(s) 208 use the routing table(s) 144 to determine that a next-hop in the route for the data packet 206 is the cloud router 118.

In the cloud router 118, the destination subnet is looked up in the router routing table 216 for the data packet 206. In this example, the destination IP in the subnet belongs to an on-preen destination EP 160. In such examples, the router 118 routes the data packet over the public network(s) 106 via the data path setup by the control plane (BGP EVPN).

Although the techniques of FIGS. 1, 2A, and 2B are written from the perspective of the common router 118 in the public cloud 104, the techniques may be similarly performed by one or more devices in the on-premises site 102. That is, a router, gateway, spine 156, and/or other device in the on-premises site 102 may perform the same or similar techniques as those performed by the common router 118 to ensure that traffic is communicated from EPs 160 to other EPs 160 in the stretched subnet 108, and/or to Eps 132 in the stretched subnet in the public cloud 104.

FIG. 3 illustrates a flow diagram of an example method 300 and that illustrate aspects of the functions performed at least partly by one or more devices in the hybrid-cloud environment 100 as described in FIGS. 1, 2A, and 2B. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method for using more-specific routing to perform scalable L2 stretching of a subnet across a hybrid cloud environment. In some examples, the method 300 may be performed by a system (and/or a device) comprising one or more processors and one or more non-transitory computer-readable media storing computer-executable instructions that, when executed by the one or more processors, cause the one or more processors to perform the method 300.

The techniques of FIG. 3 may be performed by one or more devices, such as a system of devices, such as a common router 118, a cloud controller, any cloud device, and/or any combination thereof.

At 302, a cloud controller 110 (and/or other entity) may create a private address space by allocating an Internet Protocol (IP) address range to a subnetwork that is stretched across a hybrid cloud environment. In some instances, first endpoints of the subnetwork are hosted in a virtual private cloud (VPC) 130 of a cloud environment 104 of the hybrid cloud environment 100 and second endpoints 160 of the subnetwork are hosted in an on-premises site 102 of the hybrid cloud environment 102.

At 304, the cloud controller (and/or other entity) may create a first more-specific route that corresponds to a first sub-IP-address-range of the IP address range of the subnetwork. In some examples, a first next hop for the first more-specific route sends data traffic to a cloud router of the cloud environment;

At 306, the cloud controller 110 may create a second more-specific route that corresponds to a second sub-IP-address-range of the IP address range of the subnetwork. In some examples, a second next hop for the second more-specific route sends data traffic to the cloud router of the cloud environment.

At 308, the cloud controller 110 (and/or another entity) may program the first more-specific route and the second more-specific route into routing tables of the cloud environment such that traffic originating from at least the first endpoints in the VPC is routed to the cloud router.

At 310, a cloud router 118 may receive data traffic originating from one of the first endpoints in the VPC. At 312, the cloud router 118 may route the data traffic based at least in part on a destination IP address of the data traffic and a routing table associated with the cloud router.

FIG. 4 is a computing system diagram illustrating a configuration for a datacenter 400 that can be utilized to implement aspects of the technologies disclosed herein. The example datacenter 400 shown in FIG. 4 includes several server computers 402A-402E (which might be referred to herein singularly as "a server computer 402" or in the plural as "the server computers 402") for providing computing resources. In some examples, the resources and/or server computers 402 may include, or correspond to, the EPs 132/160, and/or the EPGs 162, 164, and/or 168 described herein. Similarly, the datacenter 400 may correspond to one or more of the on-premises 102 datacenters, and/or the cloud 104 datacenters.

The server computers 402 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the datacenter 400 can also be configured to provide network services and other types of services.

In the example datacenter 400 shown in FIG. 4, an appropriate LAN 408 is also utilized to interconnect the server computers 402A-402E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between datacenters 400, between each of the server computers 402A-402E in each datacenter 400, and, potentially, between computing resources in each of the server computers 402. It should be appreciated that the configuration of the datacenter 400 described with reference to FIG. 4 is merely illustrative and that other implementations can be utilized.

In some examples, the server computers 402 may each execute one or more virtual resources that support a service or application provisioned across a set or cluster of servers 402. The virtual resources on each server computer 402 may support a single application or service, or multiple applications or services (for one or more users).

In some instances, the cloud computing network 104 may provide computing resources, like application containers, VM instances, and storage, on a permanent or an as-needed basis. Among other types of functionality, the computing resources provided by cloud computing networks may be utilized to implement the various services described above. The computing resources provided by the cloud computing networks can include various types of computing resources, such as data processing resources like application containers and VM instances, data storage resources, networking resources, data communication resources, network services, and the like.

Each type of computing resource provided by the cloud computing networks can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing networks can also be configured to provide other types of computing resources not mentioned specifically herein.

The computing resources provided by the cloud computing networks may be enabled in one embodiment by one or more datacenters 400 (which might be referred to herein singularly as "a datacenter 400" or in the plural as "the datacenters 400"). The datacenters 400 are facilities utilized to house and operate computer systems and associated components. The datacenters 400 typically include redundant and backup power, communications, cooling, and security systems. The datacenters 400 can also be located in geographically disparate locations. One illustrative embodiment for a datacenter 400 that can be utilized to implement the technologies disclosed herein will be described below with regard to FIG. 4.

Figure 5:
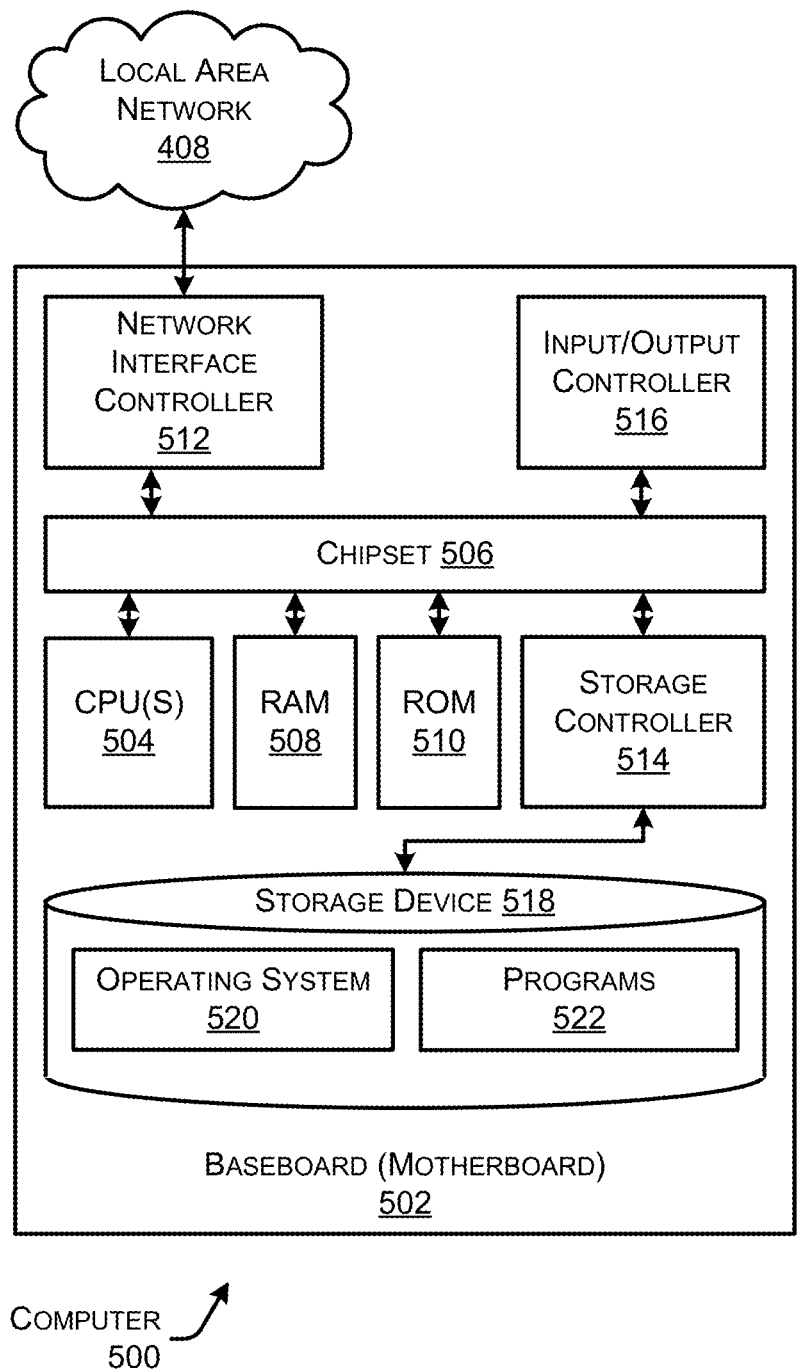
FIG. 5 is a computer architecture diagram showing an illustrative computer hardware architecture for implementing a server device that can be utilized to implement aspects of the various technologies presented herein.

FIG. 5 shows an example computer architecture for a computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 500 may, in some examples, correspond to a physical devices or resources described herein. The computer 500 may be used to perform the operations described herein, such as a computer 500 that supports the cloud controller 110, hybrid cloud controller 114, controller 112, router 118, and/or any other devices. The computer 500 may be in a system of computers that are included or comprise any of the components or entities described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 508. The chipset 506 can include functionality for providing network connectivity through a NIC 512, such as a gigabit Ethernet adapter. The NIC 512 is capable of connecting the computer 500 to other computing devices over the network 508. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the cloud computing network, and or any components included therein, may be supported by one or more devices similar to computer 500. Stated otherwise, some or all of the operations performed by the cloud computing network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The server computer 500 may support a virtualization layer, such as one or more virtual resources executing on the server computer 500. In some examples, the virtualization layer may be supported by a hypervisor that provides one or more virtual machines running on the server computer 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   creating a private address space by allocating an Internet Protocol (IP) address range to a subnetwork that is stretched across a hybrid cloud environment, wherein first endpoints of the subnetwork are hosted in a virtual private cloud (VPC) of a cloud environment of the hybrid cloud environment and second endpoints of the subnetwork are hosted in an on-premises site of the hybrid cloud environment, wherein the IP address range is a first classless inter-domain routing (CIDR) block associated with a first prefix length defined by a first integer, wherein the first integer of the first prefix length indicates a first number of IP addresses in the IP address range;
   creating a first more-specific route that corresponds to a first sub-IP-address-range of the IP address range of the subnetwork, wherein a first next hop for the first more-specific route sends data traffic to a cloud router of the cloud environment, wherein the first sub-IP-address-range of the IP address range is a second CIDR block associated with a second prefix length defined by a second integer, wherein the second integer is greater than the first integer;

creating a second more-specific route that corresponds to a second sub-IP-address-range of the IP address range of the subnetwork, wherein a second next hop for the second more-specific route sends data traffic to the cloud router of the cloud environment, wherein the second sub-IP-address-range of the IP address range is a third CIDR block associated with a third prefix length defined by a third integer, wherein the third integer is greater than the first integer, and wherein the second CIDR block and the third CIDR block encompass the first number of IP addresses in the IP address range;

programming the first more-specific route and the second more-specific route into routing tables of the cloud environment such that traffic originating from at least the first endpoints in the VPC is routed to the cloud router;

receiving, at the cloud router, data traffic originating from one of the first endpoints in the VPC; and routing the data traffic based at least in part on a destination IP address of the data traffic and a routing table associated with the cloud router.

2. The method of claim 1, wherein routing the data traffic based at least in part on a destination IP address includes:

looking up the destination IP address of the data traffic in a routing table of the cloud router; and in response to the destination IP address being associated with another one of the first endpoints, routing the data traffic to the other one of the first endpoints in the VPC.

3. The method of claim 1, wherein routing the data traffic based at least in part on a destination IP address includes:

looking up the destination IP address of the data traffic in a routing table of the cloud router; and in response to the destination IP address being associated with one of the second endpoints in the on-premises site, routing the data traffic over a public network to a network device associated with the on-premises site.

4. The method of claim 3, the VPC being a first VPC and the cloud router is hosted in a second VPC, further comprising:

determining that one or more cloud-native devices are located between the first VPC and the second VPC of the cloud environment, wherein programming the first more-specific route and the second more-specific route into routing tables of the cloud environment includes programming one or more routing tables associated with the one or more cloud-native devices with the first more-specific route and the second more-specific route.

5. The method of claim 1, wherein the subnetwork is a first subnetwork and the VPC is a first VPC, further comprising:

hosting the cloud router in a second VPC that is shared across multiple subnetworks; and creating third and fourth more-specific routes that correspond to third and fourth sub-IP-address-ranges of a second subnetwork, wherein next hops for the third and fourth more-specific routes send traffic to the cloud router in the second VPC.

6. The method of claim 1, further comprising:

receiving reachability information associated with the second endpoints in the on-premises site via one or more Border Gateway Protocol (BGP) sessions established between the cloud router and at least one on-premises router; and populating the routing table using the reachability information, wherein routing the data traffic based at least in part on a destination IP address includes:

looking up the destination IP address of the data traffic in the routing table of the cloud router; and in response to the destination IP address being associated with one of the second endpoints in the on-premises site, routing the data traffic over a public network to a network device associated with the on-premises site.

7. A system comprising:

one or more processors; and one or more non-transitory computer-readable media storing computer-executable instructions that, when executed by the one or more processors, cause the one or more processors to perform operations comprising:

creating a private address space by allocating an Internet Protocol (IP) address range to a subnetwork that is stretched across a hybrid cloud environment, wherein first endpoints of the subnetwork are hosted in a virtual private cloud (VPC) of a cloud environment of the hybrid cloud environment and second endpoints of the subnetwork are hosted in an on-premises site of the hybrid cloud environment;

creating a first more-specific route that corresponds to a first sub-IP-address-range of the IP address range of the subnetwork, wherein a first next hop for the first more-specific route sends data traffic to a cloud router of the cloud environment;

creating a second more-specific route that corresponds to a second sub-IP-address-range of the IP address range of the subnetwork, wherein a second next hop for the second more-specific route sends data traffic to the cloud router of the cloud environment;

programming the first more-specific route and the second more-specific route into routing tables of the cloud environment such that traffic originating from at least the first endpoints in the VPC is routed to the cloud router;

receiving, at the cloud router, data traffic originating from one of the first endpoints in the VPC; and routing the data traffic based at least in part on a destination IP address of the data traffic and a routing table associated with the cloud router, the routing including:

looking up the destination IP address of the data traffic in the routing table of the cloud router; and in response to the destination IP address being associated with one of the second endpoints in the on-premises site, routing the data traffic over a public network to a network device associated with the on-premises site.

8. The system of claim 7, the VPC being a first VPC and the cloud router is hosted in a second VPC, the operations further comprising:

determining that one or more cloud-native devices are located between the first VPC and the second VPC of the cloud environment, wherein programming the first more-specific route and the second more-specific route into routing tables of the cloud environment includes programming one or more routing tables associated with the one or more cloud-native devices with the first more-specific route and the second more-specific route.

9. The system of claim 7, wherein:

the IP address range is a first classless inter-domain routing (CIDR) block associated with a first prefix length defined by a first integer, wherein the first integer of the first prefix length indicates a first number of IP addresses in the IP address range;

the first sub-IP-address-range of the IP address range is a second CIDR block associated with a second prefix length defined by a second integer, wherein the second integer is greater than the first integer;

the second sub-IP-address-range of the IP address range is a third CIDR block associated with a third prefix length defined by a third integer, wherein the third integer is greater than the first integer; and the second CIDR block and the third CIDR block encompass the first number of IP addresses in the IP address range.

10. The system of claim 7, wherein the subnetwork is a first subnetwork and the VPC is a first VPC, the operations further comprising:

hosting the cloud router in a second VPC that is shared across multiple subnetworks; and creating third and fourth more-specific routes that correspond to third and fourth sub-IP-address-ranges of a second subnetwork, wherein next hops for the third and fourth more-specific routes send traffic to the cloud router in the second VPC.

11. The system of claim 7, the operations further comprising:

receiving reachability information associated with the second endpoints in the on-premises site via one or more Border Gateway Protocol (BGP) sessions established between the cloud router and at least one on-premises router; and populating the routing table using the reachability information.

12. One or more non-transitory computer-readable media storing computer-executable instructions that, when executed by one or more processors, cause the one or more processors to perform operations comprising:

creating a private address space by allocating an Internet Protocol (IP) address range to a subnetwork that is stretched across a hybrid cloud environment, wherein first endpoints of the subnetwork are hosted in a virtual private cloud (VPC) of a cloud environment of the hybrid cloud environment and second endpoints of the subnetwork are hosted in an on-premises site of the hybrid cloud environment;

creating a first more-specific route that corresponds to a first sub-IP-address-range of the IP address range of the subnetwork, wherein a first next hop for the first more-specific route sends data traffic to a cloud router of the cloud environment;

creating a second more-specific route that corresponds to a second sub-IP-address-range of the IP address range of the subnetwork, wherein a second next hop for the second more-specific route sends data traffic to the cloud router of the cloud environment;

programming the first more-specific route and the second more-specific route into routing tables of the cloud environment such that traffic originating from at least the first endpoints in the VPC is routed to the cloud router;

receiving, at the cloud router, data traffic originating from one of the first endpoints in the VPC;

routing the data traffic based at least in part on a destination IP address of the data traffic and a routing table associated with the cloud router, wherein the subnetwork is a first subnetwork and the VPC is a first VPC;

hosting the cloud router in a second VPC that is shared across multiple subnetworks; and creating third and fourth more-specific routes that correspond to third and fourth sub-IP-address-ranges of a second subnetwork, wherein next hops for the third and fourth more-specific routes send traffic to the cloud router in the second VPC.

13. The one or more non-transitory computer-readable media of claim 12, wherein routing the data traffic based at least in part on a destination IP address includes:

looking up the destination IP address of the data traffic in a routing table of the cloud router; and in response to the destination IP address being associated with another one of the first endpoints, routing the data traffic to the other one of the first endpoints in the VPC.

14. The one or more non-transitory computer-readable media of claim 12, wherein routing the data traffic based at least in part on a destination IP address includes:

looking up the destination IP address of the data traffic in a routing table of the cloud router; and in response to the destination IP address being associated with one of the second endpoints in the on-premises site, routing the data traffic over a public network to a network device associated with the on-premises site.

15. The one or more non-transitory computer-readable media of claim 14, the VPC being a first VPC and the cloud router is hosted in a second VPC, the operations further comprising:

determining that one or more cloud-native devices are located between the first VPC and the second VPC of the cloud environment, wherein programming the first more-specific route and the second more-specific route into routing tables of the cloud environment includes programming one or more routing tables associated with the one or more cloud-native devices with the first more-specific route and the second more-specific route.

16. The one or more non-transitory computer-readable media of claim 12, wherein:

the IP address range is a first classless inter-domain routing (CIDR) block associated with a first prefix length defined by a first integer, wherein the first integer of the first prefix length indicates a first number of IP addresses in the IP address range;

the first sub-IP-address-range of the IP address range is a second CIDR block associated with a second prefix length defined by a second integer, wherein the second integer is greater than the first integer;

the second sub-IP-address-range of the IP address range is a third CIDR block associated with a third prefix length defined by a third integer, wherein the third integer is greater than the first integer; and the second CIDR block and the third CIDR block encompass the first number of IP addresses in the IP address range.

* * * * *